(12) United States Patent
Mure et al.

(10) Patent No.: US 10,714,782 B2
(45) Date of Patent: Jul. 14, 2020

(54) CELL STACK DEVICE, MODULE, AND MODULE HOUSING DEVICE

(71) Applicant: Kyocera Corporation, Kyoto-shi, Kyoto (JP)

(72) Inventors: Tatsuhiro Mure, Kirishima (JP); Shinpei Shiraishi, Kirishima (JP); Kazunari Sugihara, Kirishima (JP); Mitsuhiro Nakamura, Kirishima (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 58 days.

(21) Appl. No.: 15/561,079

(22) PCT Filed: Mar. 24, 2016

(86) PCT No.: PCT/JP2016/059440
§ 371 (c)(1),
(2) Date: Sep. 25, 2017

(87) PCT Pub. No.: WO2016/158684
PCT Pub. Date: Oct. 6, 2016

(65) Prior Publication Data
US 2018/0062195 A1    Mar. 1, 2018

(30) Foreign Application Priority Data

Mar. 27, 2015   (JP) ................................. 2015-066691

(51) Int. Cl.
*H01M 8/24* (2016.01)
*H01M 8/04* (2016.01)
(Continued)

(52) U.S. Cl.
CPC ........... *H01M 8/2484* (2016.02); *H01M 8/04* (2013.01); *H01M 8/04201* (2013.01);
(Continued)

(58) Field of Classification Search
None
See application file for complete search history.

(56) References Cited

U.S. PATENT DOCUMENTS

| | | | | |
|---|---|---|---|---|
| 2003/0099884 A1* | 5/2003 | Chiang | ................. | G02F 1/1523 |
| | | | | 429/233 |
| 2007/0015060 A1* | 1/2007 | Klaassen | ................ | H01B 1/122 |
| | | | | 429/309 |

(Continued)

FOREIGN PATENT DOCUMENTS

| | | |
|---|---|---|
| CN | 101223667 A | 7/2008 |
| JP | S6217962 A | 1/1987 |

(Continued)

OTHER PUBLICATIONS

International Search Report based on Application No. PCT/JP2016/059440 (3 Pages and 1 Page of English translation) dated May 17, 2016.

*Primary Examiner* — Barbara L Gilliam
*Assistant Examiner* — Angela J Martin
(74) *Attorney, Agent, or Firm* — Viering, Jentschura & Partner MBB

(57) ABSTRACT

A cell stack device in the present disclosure includes a cell stack including a plurality of arranged cells, and a first manifold configured to fix a first end of each of the cells with a sealing material and supply reactive gas to the cells. The first manifold includes a frame body configured to fix the first end of each of the cells with the sealing material inside the frame body, and a plate body bonded to a first end portion of the frame body and having a rigidity lower than that of the frame body. A module in the present disclosure includes a housing and the cell stack device housed in the housing. Furthermore, a module housing device in the present disclosure includes an external casing, the module in (Continued)

the external casing, and an auxiliary device configured to operate the module in the external casing.

19 Claims, 8 Drawing Sheets

(51) Int. Cl.
  *H01M 8/06* (2016.01)
  *H01M 8/12* (2016.01)
  *H01M 8/2484* (2016.01)
  *H01M 8/2485* (2016.01)
  *H01M 8/0612* (2016.01)
  *H01M 8/04082* (2016.01)
  *H01M 8/243* (2016.01)
  *H01M 8/2475* (2016.01)

(52) U.S. Cl.
  CPC ............ *H01M 8/0631* (2013.01); *H01M 8/24* (2013.01); *H01M 8/243* (2013.01); *H01M 8/2475* (2013.01); *H01M 8/2485* (2013.01); *H01M 8/12* (2013.01)

(56) References Cited

U.S. PATENT DOCUMENTS

| | | | |
|---|---|---|---|
| 2007/0015061 A1* | 1/2007 | Klaassen | H01M 4/13 429/322 |
| 2010/0167154 A1* | 7/2010 | Ono | H01M 8/0247 429/457 |

FOREIGN PATENT DOCUMENTS

| | | |
|---|---|---|
| JP | 2007059377 A | 3/2007 |
| JP | 2012094398 A | 5/2012 |
| JP | 2013103119 A | 5/2013 |

\* cited by examiner

CELL STACK DEVICE, MODULE, AND MODULE HOUSING DEVICE

RELATED APPLICATIONS

The present application is a national stage entry according to 35 U.S.C. 371 of PCT application No.: PCT/JP2016/059440 filed on Mar. 24, 2016, which claims priority from Japanese application No.: 2015-066691 filed on Mar. 27, 2015, which are incorporated herein by reference in their entirety.

TECHNICAL FIELD

The present invention relates to a cell stack device, a module, and a module housing device.

BACKGROUND ART

In recent years, various technologies have been proposed as next generation energy sources including: fuel cell modules that include a fuel cell stack device constituted by a plurality of fuel cells being arranged in a housing, the fuel cells being a type of cell capable of generating power using a fuel gas (hydrogen-containing gas) and an oxygen-containing gas (air); and fuel cell devices that include fuel cell modules in an exterior casing (e.g. Patent Document 1).

Additionally, technologies have been proposed such as: electrolytic modules that include an electrolytic cell stack device housed in a housing, the electrolytic cell stack device being constituted by arranging a plurality of electrolytic cells which produce hydrogen and oxygen ($O_2$) by electrolyzing water vapor (water) via provision of water vapor and voltage; and electrolytic devices that include electrolytic modules in an exterior casing (e.g. Patent Document 2).

CITATION LIST

Patent Literature

Patent Document 1: JP-A-2007-59377
Patent Document 2: JP-A-2013-103119

SUMMARY OF INVENTION

A cell stack device of the present disclosure includes: a cell stack including a plurality of arranged cells; and a first manifold configured to fix a first end of each of the cells with a sealing material and supply reactive gas to the cells.

The first manifold includes a frame body configured to fix the first end of each of the cells with the sealing material inside the frame body, and a plate body bonded to a first end portion of the frame body and having a rigidity lower than that of the frame body.

A module of the present disclosure includes a housing and the above-mentioned cell stack device housed in the housing.

Furthermore, a module housing device of the present disclosure includes an external casing, the module housed in the external casing, and an auxiliary device configured to operate the module housed in the external casing.

DESCRIPTION OF EMBODIMENTS

A cell stack device, a module, and a module housing device will be described using FIGS. 1 to 14.

Note that herein, "cell" shall be construed to include the meanings of "fuel cell" and "electrolytic cell".

Additionally, "cell stack device" shall be construed to include the meanings of "fuel cell stack device" and "electrolytic cell stack device".

Furthermore, "module" shall be construed to include the meanings of "fuel cell module" and "electrolytic module".

Moreover, "module housing device" shall be construed to include the meanings of "fuel cell device" and "electrolytic device".

Figure 1:
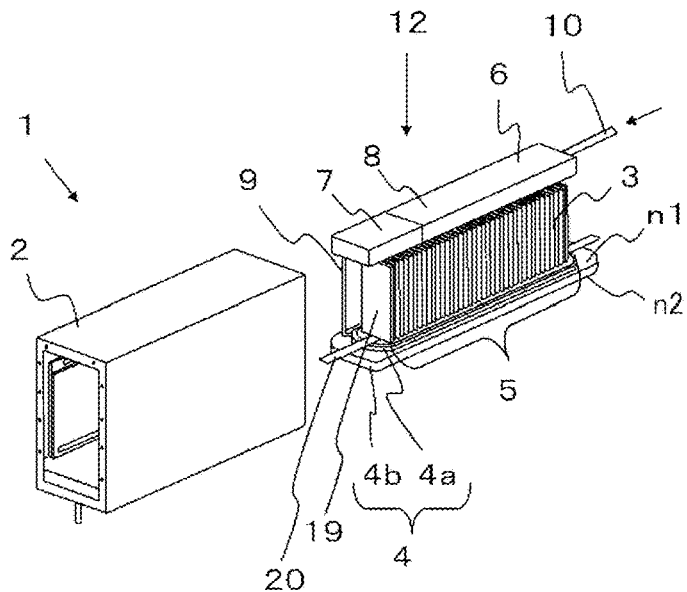
FIG. 1 is an exterior perspective view illustrating a fuel cell module provided with an example of a fuel cell stack device of the present embodiment formed using fuel cells.
Figure 2A:
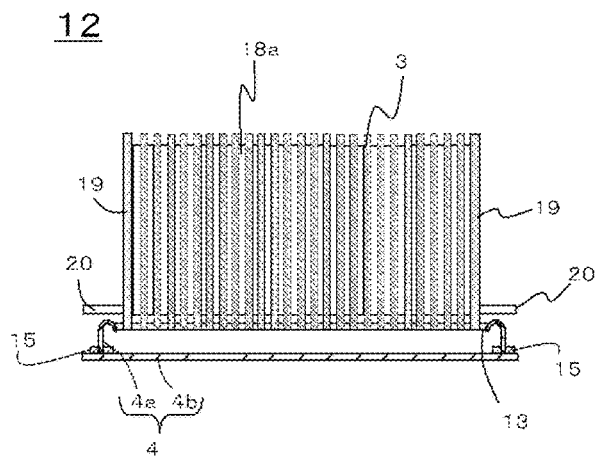
FIG. 2A is a cross-sectional view of a side surface side of the fuel cell stack device illustrated in FIG. 1.
Figure 2B:
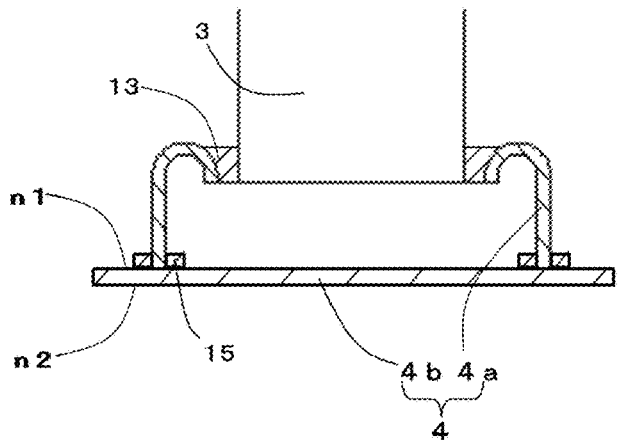
FIG. 2B is a cross-sectional view of a front surface side and is an enlarged cross-sectional view of a bonding portion between a cell stack and a first manifold.

FIG. 1 is an exterior perspective view illustrating an example of a fuel cell module of the present embodiment formed using fuel cells. FIG. 2A is a cross-sectional view of a side surface side of the fuel cell stack device illustrated in FIG. 1. FIG. 2B is a cross-sectional view of a front surface side and is an enlarged cross-sectional view of a bonding portion between a cell stack and a first manifold.

Note that in the subsequent drawings, the same reference numerals are used for the same components.

Further, a part of hatching is omitted from FIG. 2A.

A fuel cell module 1 illustrated in FIG. 1 includes a fuel cell stack device 12 provided with one cell stack 5 housed in a housing 2. In the cell stack 5, fuel cells 3 are arranged uprightly in a row, each including a gas-flow passage (not illustrated) through which fuel gas flows from a first end of the cell to a second end; the fuel cells 3 adjacent to each other are electrically connected in series via electrically conductive members (not illustrated in FIG. 1); and a lower end of each of the fuel cells 3 is fixed to a first manifold 4 by an insulative bonding material (not illustrated) such as a glass sealing material.

A reformer 6 for generating fuel gas to be supplied to the fuel cells 3 is disposed above the cell stack 5.

At the end portions of the cell stack 5, an electrically conductive end member 19 is disposed that includes an electrically conductive portion 20 for collecting electricity generated by the power generation in the cell stack 5 (the fuel cells 3) and drawing the electricity out of the cell stack 5.

Moreover, the fuel cell stack device 12 may also include the reformer 6.

The first manifold 4 stores the fuel gas to be supplied to the fuel cells 3 in a space formed by a frame body 4a and a plate body 4b, which will be described below.

Further, the examples of the fuel cells 3 illustrated in FIG. 1 are hollow flat plate-shaped fuel cells that each include a plurality of fuel gas-flow passages that allow fuel gas to flow through the fuel cells in the longitudinal direction thereof. The fuel cells 3 are solid oxide fuel cells that each include an inner electrode layer, a solid electrolyte layer, and an outer electrode layer stacked in that order on a surface of a support body that includes the fuel gas-flow passage.

The configuration of the fuel cells 3 will be described below.

Further, in the fuel cell device of the present embodiment, the fuel cells 3 may, for example, be flat plate-shaped or cylindrical-shaped. In addition, the shape of the housing 2 may also be changed as appropriate.

Moreover, the reformer 6 illustrated in FIG. 1 reforms a raw fuel such as natural gas or kerosene supplied via a raw fuel supply pipe 10 to produce a fuel gas.

In embodiments, it is preferable that the reformer 6 be capable of performing efficient reforming reactions such as steam reforming. Accordingly, the reformer 6 includes a vaporizing unit 7 that vaporizes water and a reforming unit 8 that has a reforming catalyst (not illustrated) for reforming the raw fuel into fuel gas disposed therein.

Then, the fuel gas produced in the reformer 6 is supplied to the first manifold 4 via a fuel gas leading-out pipe 9. The fuel gas is then supplied via the first manifold 4 to the fuel gas-flow passages formed inside the fuel cells 3.

Moreover, FIG. 1 illustrates the fuel cell stack device 12 housed in the housing 2, with the fuel cell stack device 12 removed rearward and a portion of the housing 2 (front and back surfaces) removed.

Here, in the fuel cell module 1 illustrated in FIG. 1, the fuel cell stack device 12 can be slid into and housed in the housing 2.

Further, in the fuel cell module 1 configured as described above, the fuel gas and the oxygen-containing gas discharged from the fuel gas-flow passages of the fuel cells 3 and not used in power generation are combusted between an upper end of each of the fuel cells 3 and the reformer 6, making it possible to increase and maintain the temperature of the fuel cells 3.

In addition, this makes it possible to heat the reformer 6 disposed above the fuel cells 3 (cell stack 5), and efficiently perform reformation reactions in the reformer 6.

Furthermore, during normal power generation, the fuel cell module 1 has a temperature of approximately 500 to 1000° C. due to the above-mentioned combustion process and the generation of power in the fuel cells 3.

Figure 3:
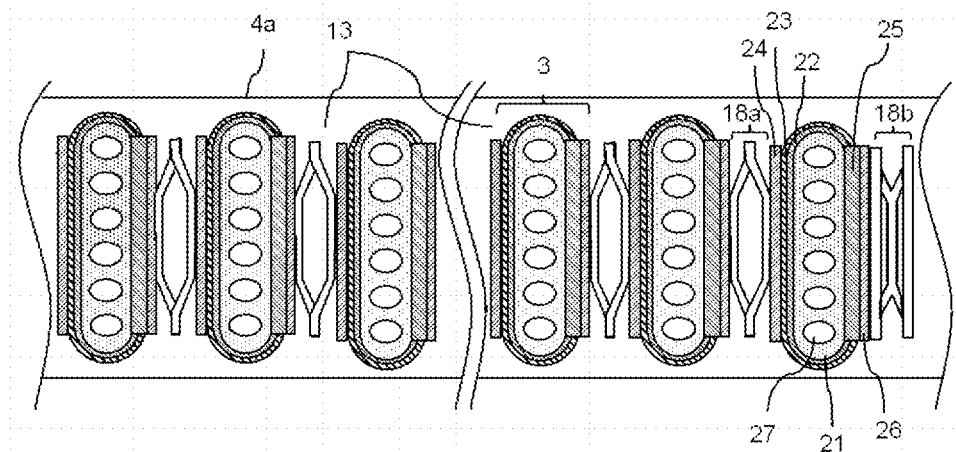
FIG. 3 is a cross-sectional view illustrating a part of the fuel cell stack device of the present embodiment illustrated in FIG. 1.

FIG. 3 is a cross-sectional view illustrating a part of the fuel cell stack device of the present embodiment.

As illustrated in FIGS. 2A, 2B and 3, the frame body 4a encloses a first end of each of the fuel cells 3 (lower end portion in FIG. 3), and peripheries of the first ends of the fuel cells 3 are fixed using a sealing material 13 with which the inside of the frame body 4a is filled.

In other words, the cell stack 5 is bonded to the frame body 4a using the sealing material 13 and houses the plurality of fuel cells 3 such that the fuel cells 3 are arranged in a row within the frame body 4a and are connected via electrically conductive members 18a.

Note that the area within the frame body 4a is the fixed portion.

Additionally, a material having thermal resistance and electrically insulating properties such as, for example, glass or the like, is preferably used as the sealing material 13.

The electrically conductive end member 19 is connected to the fuel cell 3 positioned outermost in the arrangement direction of the fuel cells 3 in the cell stack 5 via an electrically conductive member 18b disposed on the outer side of this outermost fuel cell 3.

The electrically conductive end member 19 herein may have a flat plate shape.

As a result of this configuration, the electrically conductive end member 19 can draw out electrical current from the electrically conductive member 18b across a wide area and can suppress deformation of the fuel cells 3.

Additionally, the electrically conductive end member 19 may be configured such that a first end (lower end) thereof is positioned below a lower end of the electrically conductive member 18b and a second end (upper end) thereof is positioned above an upper end of the electrically conductive member 18b.

As a result of this configuration, the electrically conductive end member 19 will be connected to the electrically conductive member 18b across a wide contact area.

Accordingly, the electrically conductive end member 19 can draw out electrical current from the electrically conductive member 18b across the wide area.

The electrically conductive end member 19 includes an electrically conductive portion 20 protruding outward from the cell stack 5.

The electrically conductive portion 20 is separated from the first manifold 4.

While not illustrated in the drawings, a protective cover may be provided on the outer side of the electrically conductive end member 19 to protect the electrically conductive end member 19 and the cell stack 5 from external impacts and contact with thermal insulating material disposed around the cell stack 5.

For the assembly of this configuration, the first end of the cell stack 5 is bonded to the frame body 4a with the sealing material 13. After that, the frame body 4a can be separately bonded to the plate body 4b.

Hereinafter, the fuel cells 3 constituting the cell stack device 12 will be described.

As illustrated in FIG. 3, each fuel cell 3 is column-shaped (for example, hollow flat plate-shaped) and includes a column-shaped conductive supporting substrate 21 (hereinafter, sometimes abbreviated as "supporting substrate 21") that has a pair of flat surfaces facing one another and an inner electrode layer 22, a solid electrolyte layer 23, and an outer electrode layer 24 stacked in that order on one of the flat surfaces.

Gas-flow passages 27 through which gas flows are provided in the conductive supporting substrate 21. FIG. 3 illustrates an example in which six gas-flow passages 27 are provided.

The example illustrated in FIG. 3 will be described with the inner electrode layer 22 as a fuel-side electrode layer and the outer electrode layer 24 as an air-side electrode layer.

Note that the fuel cell 3 may have a configuration in which the inner electrode layer 22 is the air-side electrode layer, the outer electrode layer 23 is the fuel-side electrode layer, and oxygen-containing gas flows through the gas-flow passages 27.

Furthermore, in certain embodiments, the supporting substrate 21 may double as the fuel-side electrode layer, the fuel cell may be formed by the solid electrolyte layer, and the air-side electrode layer may be stacked on the surface of the supporting substrate.

An interconnector 25 is formed on the other flat surface of the fuel cell 3, and a p-type semiconductor layer 26 is formed on the outer (upper) surface of the interconnector 25.

The p-type semiconductor layer 26 connects the electrically conductive member 18a to the interconnector 25, forming an ohmic contact therebetween and thereby making it possible to reduce the voltage drop thereacross and to effectively avoid decreases in current collection performance.

A well-known conventional material may be used for the fuel-side electrode layer 22. For example, the fuel-side electrode layer 22 is formed of $ZrO_2$ (referred to as a stabilized zirconia that also includes partially stabilized zirconia) containing a porous conductive ceramic such as a rare earth element oxide in solid solution and at least one of Ni and NiO.

In embodiments, the solid electrolyte layer 23 is required to function as an electrolyte that allows electrons to move between the fuel-side electrode layer 22 and the air-side electrode layer 24 and as a gas barrier that prevents leaks of fuel gas and oxygen-containing gas. As such, the solid electrolyte layer 23 is formed of $ZrO_2$ containing from 3 to 15 mol % of a rare earth element oxide in solid solution.

Note that the solid electrolyte layer 23 may be formed from another material as long as that material exhibits the above-described properties.

The material for the air-side electrode layer 24 is not particularly limited, and any well-known conventional material may be used. For example, the air-side electrode layer 24 may be formed of an electrically conductive ceramic made from a so-called $ABO_3$ perovskite oxide.

In embodiments, the air-side electrode layer 24 is required to be gas permeable, and it is preferable that the open porosity of the air-side electrode layer 24 be in the range of 20 to 50%.

It is required for the supporting substrate 21 to be gas permeable to allow the fuel gas to permeate through to the fuel-side electrode layer 22 and also be electrically conductive in order to allow current collection via the interconnector 25.

Therefore, a material such as an electrically conductive ceramic or cermet may be used for the supporting substrate 21.

For production of the cells 3, if the supporting substrate 21 is produced by simultaneous sintering with one of the fuel-side electrode layer 22 and the solid electrolyte layer 23, the supporting substrate 21 may be formed of an iron group metal component and a prescribed rare earth oxide.

Moreover, in each of the fuel cells 3 illustrated in FIG. 3, the column-shaped (hollow flat plate-shaped) supporting substrate 21 has a long, thin plate shape that extends in the standing direction and includes two flat surfaces and two semicircular side surfaces.

Furthermore, to ensure gas permeability, it is preferable that the supporting substrate 21 has an open porosity of greater than or equal to 30% and particularly in the range of 35 to 50%. It is also preferable that the supporting substrate 21 has an electrical conductivity of greater than or equal to 300 S/cm and particularly greater than or equal to 440 S/cm.

In addition, the supporting substrate 21 may be cylinder-shaped as long as the overall columnar shape is retained.

Examples of the p-type semiconductor layer 26 may include, for example, a layer formed of a perovskite transition metal oxide.

More specifically, a material that has a higher electron conductivity than the material forming the interconnector 25 such as a p-type semiconductor ceramic formed of at least one of an $LaMnO_3$ oxide, an $LaFeO_3$ oxide, and an $LaCoO_3$ oxide having Mn, Fe, Co, or the like at the B site may be used, for example.

It is generally preferable that the thickness of this p-type semiconductor layer 26 be in the range of 30 to 100 μm.

A material such as a lanthanum chromite-based perovskite-type oxide (an $LaCrO_3$ oxide) or a lanthanum strontium titanium-based perovskite-type oxide (an $LaSrTiO_3$ oxide) may be used for the interconnector 25.

These materials have electrically conductive properties and do not reduce or oxidize upon coming into contact with the fuel gas (a hydrogen-containing gas) or the oxygen-containing gas (air or the like).

Moreover, the interconnector 25 is required to be dense in order to prevent leaks of the fuel gas flowing through gas-flow passages 27 formed in the supporting substrate 21 as well as leaks of the oxygen-containing gas flowing outside the supporting substrate 21. Thus, it is preferable that the interconnector 25 has a relative density of greater than or equal to 93% and particularly greater than or equal to 95%.

Furthermore, the electrically conductive member 18a interposed to electrically connect the fuel cells 3, the electrically conductive member 18b positioned outermost in the cell stack, and the electrically conductive end member 19 may be formed of an elastic metal or alloy or of a metal fiber or alloy fiber felt to which the necessary surface treatments have been applied.

Fuel gas is supplied to each fuel cell in a fuel cell stack device, and water vapor is supplied to each electrolytic cell in an electrolytic device.

These fuel cells or electrolytic cells are fixed, via a sealing material, to a manifold configured to allow fuel gas or water vapor to be supplied to the fuel cell or the electrolytic cell.

However, as the manifold is placed in a high temperature environment during the step of bonding the cell stack to the manifold with the sealing material, it may experience thermal expansion.

Then the manifold, which has been thermally expanded once, thermally shrinks by being cooled after the bonding step.

At this time, for example, if the member to which the frame body of the manifold is bonded is a boxed-shaped gas case, shrinkage stress generated in the frame body by the thermal shrinkage of the gas case tends to increase because the gas case has relatively high rigidity.

As a result, high stress is applied to the bonding portion between the fuel cells and the sealing material particularly at the end portions of the cell stack in the arrangement direction of the fuel cells. Accordingly, the sealing material may crack and the gas may thus leak therefrom.

Therefore, a cell stack device that can suppress cracking of the sealing material and has improved long-term reliability, a module provided with the same, and a module housing device are desired.

Thus, in the cell stack device 12 of the present embodiment, the first manifold 4 is configured to include both the frame body 4a that fixes the first end of each of the fuel cells 3 inside the frame body 4a with the sealing material 13, and the plate body 4b that is bonded to the first end portion of the frame body 4a and has a rigidity lower than that of the frame body 4a, as illustrated in FIGS. 2A and 2B.

Figure 4:
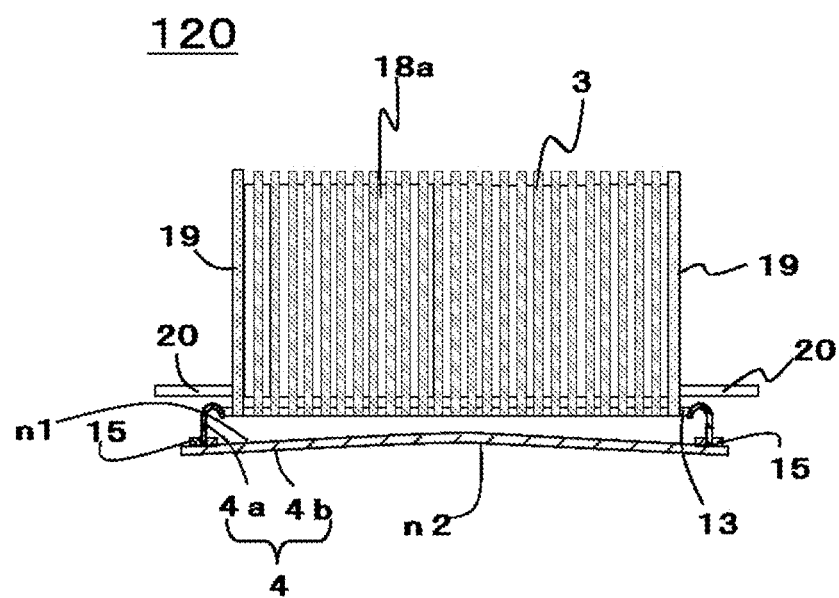
FIG. 4 is a cross-sectional view of a side surface side illustrating another example of the fuel cell stack device of the present embodiment.

In this configuration, as illustrated in FIG. 4, the plate body 4b can relieve the stress due to the thermal shrinkage of the first manifold 4 by deformation of the plate body 4b having low rigidity.

Accordingly, the stress applied to the bonding portion between the fuel cells 3 and the sealing material 13 can be reduced. This can suppress the occurrence of cracking in the sealing material 13 that bonds the fuel cells 3 and suppress leaks of the gas.

Note that "rigidity" shall be construed as bending rigidity herein.

The bending rigidity can be expressed by the following relational expression.

Rigidity(bending rigidity)=$E \times I/L$

E: Young's modulus
I: Cross-sectional secondary moment
L: Length of each member in arrangement direction of cells In the example illustrated in FIGS. 2A and 2B, an upper end of the frame body 4a is bent toward the inside of the frame body 4a.

The internal space side of this bent end portion is the bonding portion bonded to the fuel cells 3.

Note that the frame body 4a is not limited to this example, and the upper end of the frame body 4a may not be bent.

For example, the frame body 4a may be tubular.

In embodiments in which the frame body 4a has a tubular shape, the internal area at the upper end portion of the frame body 4a is the bonding portion bonded to the cell stack 5.

Further, as in the example illustrated in FIG. 1, an end portion of the gas outlet side of the fuel gas leading-out pipe 9 is bonded to the side surface of the frame body 4a.

Accordingly, the fuel gas is supplied from the fuel gas leading-out pipe 9 to the internal space of the first manifold 4.

Note that the end portion of the gas outlet side of the fuel gas leading-out pipe 9 may be bonded to a second surface n2 as the bottom surface of the plate body 4b.

In the following description, a surface of the plate body 4b to which the frame body 4a is bonded is referred to as a first surface n1 and a surface opposite to the first surface is referred to as a second surface n2.

In the examples illustrated in FIGS. 1, 2A, and 2B, the plate body 4b is substantially rectangular in plan view.

An outer edge of the plate body 4b is positioned on the outer side of the frame body 4a and the cell stack 5 in plan view from the viewpoint of supporting the frame body 4a and the cell stack 5.

Although the plate body 4b has flat surfaces in the examples illustrated in FIGS. 1, 2A, and 2B, the following description refers to an embodiment in which the plate body 4b has a groove and a peripheral edge bent toward the cell stack 5.

In the example illustrated in FIGS. 2A and 2B, the lower end portion, which serves as the first end portion of the frame body 4a, is bonded to the first surface n1 of the plate body 4b with a bonding material 15.

A material having thermal resistance such as, for example, glass or the like, is preferably used as the bonding material 15.

In the example illustrated in FIGS. 2A and 2B, the bonding material 15 is provided having an annular shape at the lower end portion of the frame body 4a along an outer surface and an inner surface of the frame body 4a.

The bonding material 15 may be sandwiched between the lower end portion of the frame body 4a and the first surface n1 of the plate body 4b.

In the example illustrated in FIGS. 2A and 2B, the frame body 4a and the plate body 4b are bonded to each other with the bonding material 15, but the frame body 4a and the plate body 4b may be bonded to each other by a method without using the bonding material, such as welding.

As a material for the frame body 4a and the plate body 4b constituting the first manifold 4, a metal material having thermal resistance and corrosion resistance is preferable, with ferrite-based stainless steel as one example.

FIG. 4 is a cross-sectional view of a side surface side illustrating another example of the cell stack device of the present embodiment.

In the example illustrated in FIG. 4, the plate body 4b is bent toward the cell stack 5.

This configuration allows the plate body 4b to easily change shape, such that the stress due to the thermal shrinkage of the first manifold 4 can be further relieved.

Accordingly, the stress applied to the bonding portion bonded to the sealing material 13 can be reduced and leaks of the gas can be suppressed.

Figure 5A:
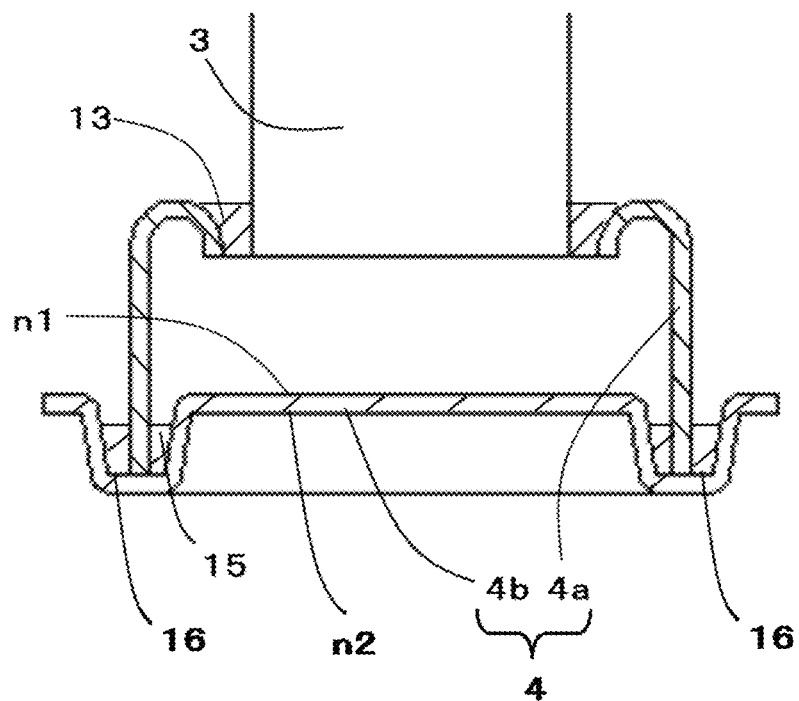
FIG. 5A is a cross-sectional view of a front surface side illustrating still another example of the fuel cell stack device of the present embodiment, and is an enlarged cross-sectional view of the bonding portion between the cell stack and the first manifold.
Figure 5B:
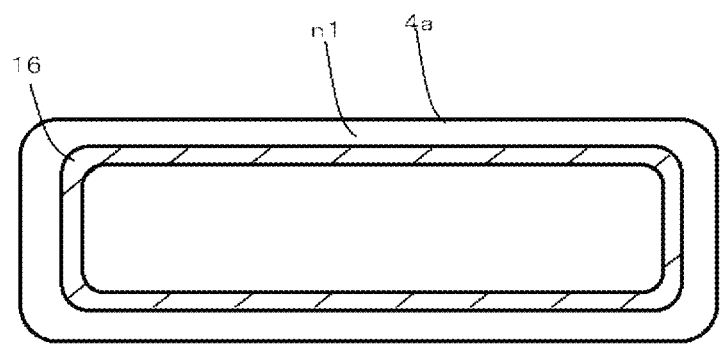
FIG. 5B is a plan view of a plate body illustrated in FIG. 5A.

FIG. 5A is a cross-sectional view of a front surface side illustrating still another example of the fuel cell stack device of the present embodiment, and is an enlarged cross-sectional view of the bonding portion between the cell stack and the first manifold. FIG. 5B is a plan view of a plate body illustrated in FIG. 5A.

Note that the hatched area in FIG. 5B illustrates a first groove 16a.

In the example of FIGS. 5A and 5B, the annular first groove 16a is provided in the first surface n1 of the plate body 4b, and the first end portion of the frame body 4a is bonded to an inner portion of the first groove 16a with the bonding material 15.

This configuration allows a reservoir portion of the bonding material 15 to be provided having an annular shape in the inner and outer surfaces at the first end portion of the frame body 4a along the first end portion of the frame body 4a.

Thus, the frame body 4a can be firmly bonded to the plate body 4b.

Accordingly, leaks of the gas can be suppressed.

The annular first groove 16a is provided in the first surface n1 of the plate body 4b; that is, a central area of the plate body 4b protrudes toward the cell stack 5.

In this way, a space surrounded by the first groove 16a is provided on the second surface n2 side of the plate body 4b.

As illustrated in FIG. 1, this configuration allows the space to be formed between the bottom surface inside the housing 2 and the second surface n2 of the plate body 4b when the fuel cell stack device 12 is placed inside the housing 2.

Thus, dissipation of thermal energy from inside the first manifold 4 to the housing 2 can be mitigated by the plate body 4b.

This can prevent a loss of heat needed for the power generation of the fuel cells 3, so that power generation efficiency can be improved.

Figure 6A:
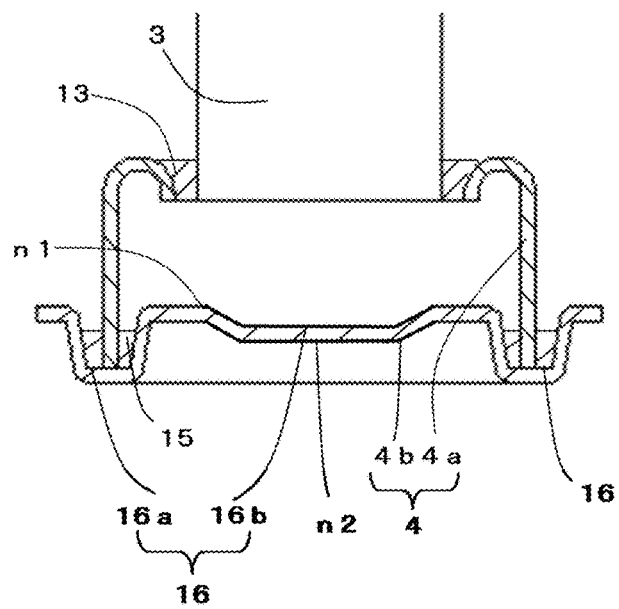
FIG. 6A is a cross-sectional view of a front surface side illustrating still another example of the fuel cell stack device of the present embodiment, and is an enlarged cross-sectional view of the bonding portion between the cell stack and the first manifold.
Figure 6B:
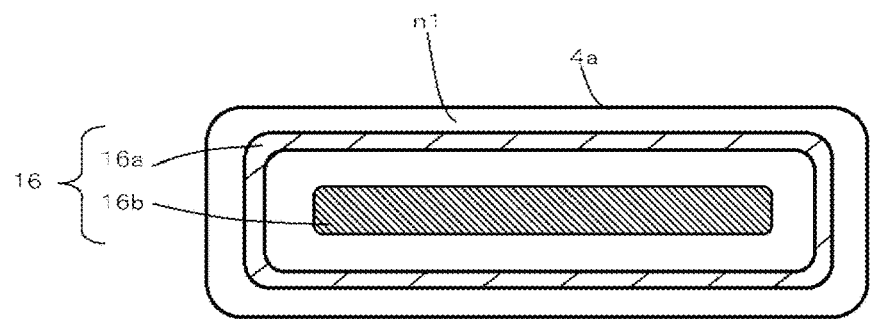
FIG. 6B is a plan view of the plate body illustrated in FIG. 6A.

FIG. 6A is a cross-sectional view of a front surface side illustrating still another example of the fuel cell stack device of the present embodiment, and is an enlarged cross-sectional view of the bonding portion between the cell stack and the first manifold. FIG. 6B is a plan view of the plate body illustrated in FIG. 6A.

Note that the hatched areas in FIG. 6B illustrate a first groove 16a and a second groove 16b.

In the example illustrated in FIGS. 6A and 6B, the plate body 4b includes the second groove 16b that extends in the arrangement direction of the cells 3 on the inner side of the first groove 16a in plan view.

In other words, the plate body 4b includes the second groove 16b that extends in the arrangement direction of the cells 3 in the area of the first surface n1 surrounded by the first groove 16a.

This configuration allows the fuel gas, which flows from the fuel gas leading-out pipe 9 into the manifold 4, to efficiently flow to the cell 3 at the end portion of the cell stack 5.

This can improve the power generation efficiency.

A depth of the second groove 16b can be set as appropriate, and may be substantially the same as a depth of the first groove 16a.

Further, a plurality of the second grooves 16b may be provided.

Note that a length of one second groove 16b may be greater than or equal to a quarter of the entire length of the cell stack in the arrangement direction of the cells 3.

Note that rigidity of the plate body 4a can be adjusted by controlling a depth of one of the first groove 16a and the second groove 16b of the plate body 4a.

Figure 7:
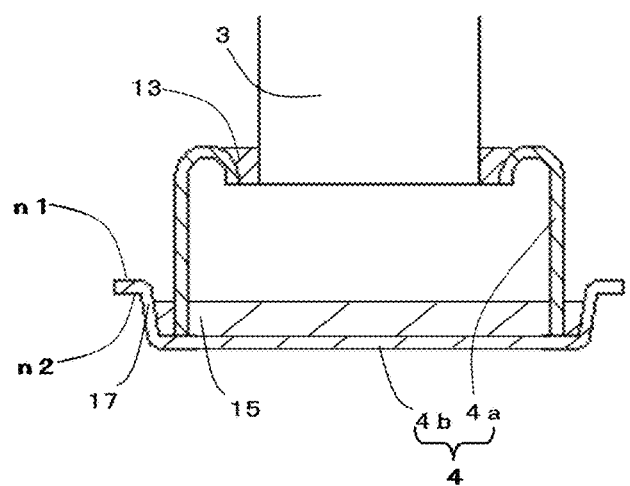
FIG. 7 is a cross-sectional view of a front surface side illustrating still another example of the fuel cell stack device of the present embodiment, and is an enlarged cross-sectional view of the bonding portion between the cell stack and the first manifold.

FIG. 7 is a cross-sectional view of a front surface side illustrating still another example of the fuel cell stack device of the present embodiment, and is an enlarged cross-sectional view of the bonding portion between the cell stack and the first manifold.

In the example illustrated in FIG. 7, a peripheral edge 17 of the plate body 4b is bent toward the cell stack 5. The first end portion of the frame body 4a is bonded to the plate body 4b with a bonding material, and the bonding material is provided in the frame body 4a and on the plate body 4b side.

In this configuration, the first surface n1 of the plate body 4b in the internal space of the first manifold 4 is covered with the bonding material 15. Accordingly, the bonding material 15 insulates the temperature inside the first manifold 4 from heat, making it possible to prevent the heat from dissipating to the outside via the plate body 4b.

This can prevent a loss of heat needed for the power generation of the fuel cells 3, so that power generation efficiency can be improved.

Figure 8A:
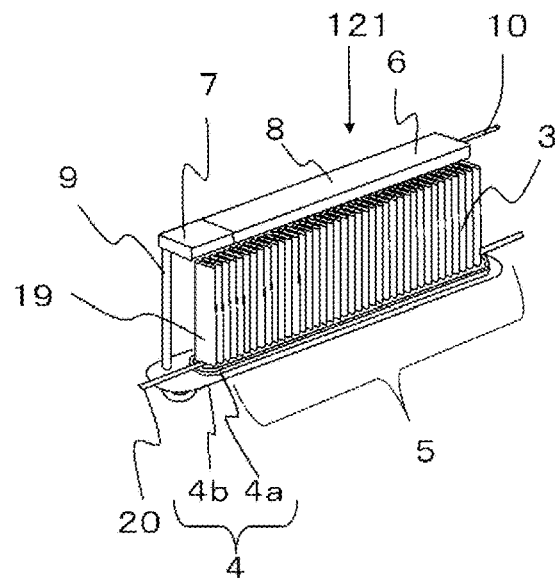
FIG. 8A is an exterior perspective view of a fuel cell stack device illustrating still another example of the present embodiment.
Figure 8B:
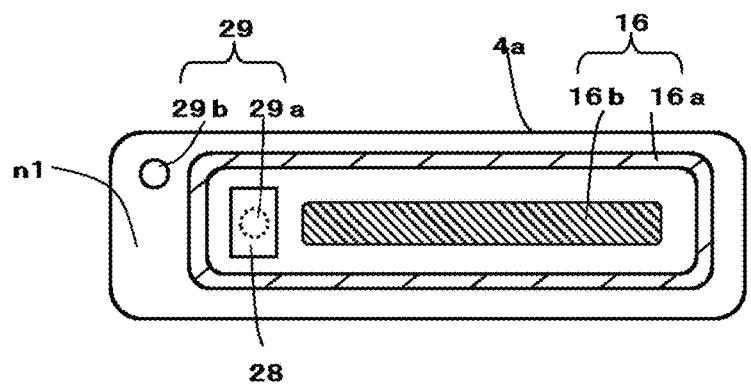
FIG. 8B is a plan view from which a part of the stack device illustrated in FIG. 8A is omitted.

FIG. 8A is an exterior perspective view of a fuel cell stack device illustrating still another example of the present embodiment. FIG. 8B is a plan view from which a part of the stack device illustrated in FIG. 8A is omitted.

Figure 9:
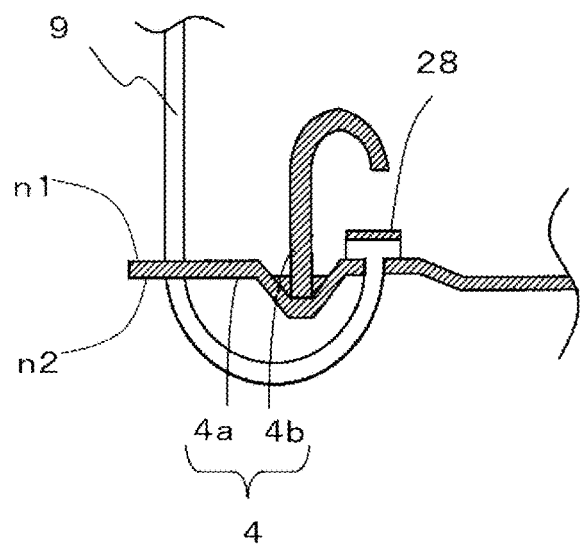
FIG. 9 is a cross-sectional view illustrating an enlarged part of the fuel cell stack device illustrated in FIG. 8.

FIG. 9 is a cross-sectional view illustrating an enlarged part of the fuel cell stack device illustrated in FIGS. 8A and 8B.

A fuel cell stack device 121 illustrated in FIGS. 8A, 8B and 9 includes a reformer 6 disposed above a first manifold 4 and a fuel gas leading-out pipe 9 for leading the fuel gas from the reformer 6 to the first manifold 4.

A first end of the fuel gas leading-out pipe 9 is connected to a first through-hole 29a that penetrates a plate body 4a within a frame body in plan view from a second surface n2 side.

The first manifold 4 includes a rectifying plate 28 that is separated from the first end of the fuel gas leading-out pipe 9 and covers the first end thereof.

This configuration allows the fuel gas, which flows from the fuel gas leading-out pipe 9 connected to the plate body 4a into the first manifold 4, to efficiently flow to the cell 3 disposed relatively away from the fuel gas leading-out pipe 9.

This can improve power generation efficiency.

Note that as long as the first end of the fuel gas leading-out pipe 9 is connected to the first through-hole 29a, the first end thereof may be connected to the first through-hole 29a from the first surface n1 side, the second surface n2 side, or within the through-hole 29a, for example.

Further, the rectifying plate 28 may be provided on the plate body 4a of the first manifold 4 and may be provided on the frame body 4b thereof.

Also, to further improve the flow distribution rate, the rectifying plate 28 may be provided vertically with respect to the flow direction of the fuel gas flowing from the first through-hole.

The rectifying plate 28 may include an opening.

The opening may be provided such that the fuel gas flows toward the cell 3 at the end portion of the cell stack 5 away from the rectifying plate 28.

The fuel gas leading-out pipe 9 in the fuel cell stack device 121 illustrated in FIGS. 8A, 8B and 9 may be inserted in a second through-hole 29b that penetrates the plate body 4a outside the frame body 4b. The fuel gas leading-out pipe 9 is bonded to the plate body 4a at the second through hole 29b.

This configuration can increase the number of bonding points between the fuel gas leading-out pipe 9 and the plate body 4a. Thus, even if the plate body 4a is deformed, stress applied to the first end of the fuel gas leading-out pipe 9 connected to the first through-hole 29a of the plate body 4a can be dispersed.

That is to say, this configuration can improve the long-term reliability of the fuel cell stack device 121.

Note that the fuel gas leading-out pipe 9 can be bonded to the second through-hole 29b from the first surface n1 side or the second surface n2 side.

Note that the "second through-hole 29b" shall be construed to include a partial opening in the edge portion of the plate body 4a in plan view of the plate body 4a.

Figure 10:
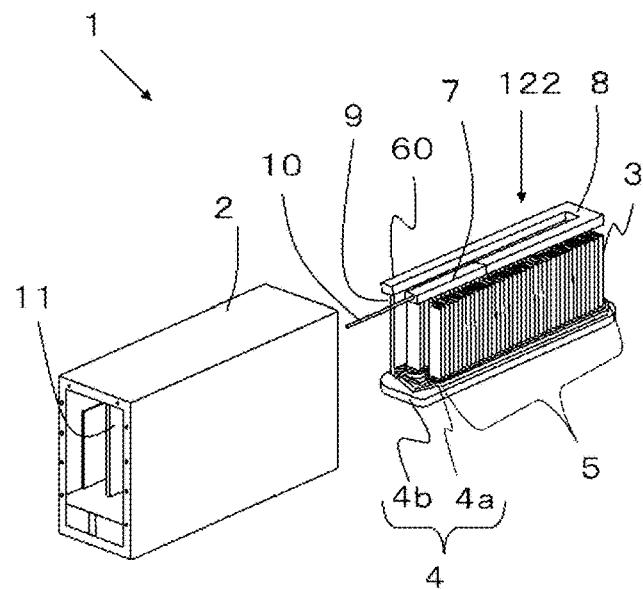
FIG. 10 is an exterior perspective view illustrating a fuel cell module provided with still another example of a fuel cell stack device of the present embodiment formed using fuel cells.

FIG. 10 is an exterior perspective view illustrating a fuel cell module provided with another example of a fuel cell stack device of the present embodiment formed using fuel cells.

Figure 11:
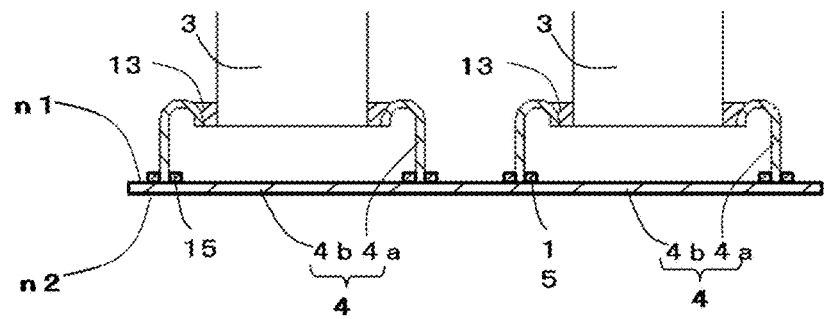
FIG. 11 is a cross-sectional view of a front surface side of the fuel cell stack device illustrated in FIG. 10, and is an enlarged cross-sectional view of a bonding portion between a cell stack and a first manifold.

FIG. 11 is a cross-sectional view of a front surface side of the fuel cell stack device illustrated in FIG. 10, and is an enlarged cross-sectional view of a bonding portion between a cell stack and a first manifold.

Note that an electrically conductive end member and an electrically conductive portion are omitted from FIG. 10.

In the examples illustrated in FIGS. 10 and 11, two cell stacks 5 are bonded to a first manifold 4 with a sealing material 13.

As illustrated in FIG. 10, in embodiments that include two cell stacks 5, an end portion of an outlet side of the fuel gas leading-out pipe 9 may be divided into two pipes.

The two divided end portions may each be bonded to a frame body 4a to which the corresponding cell stack 5 is bonded.

This configuration allows the fuel gas leading-out pipe 9 to supply the fuel gas to each of the frame bodies 4a.

Note that as long as the fuel gas leading-out pipe 9 is divided into two pipes, any portion thereof can be divided.

An oxygen-containing gas introduction member 11 is disposed inside the housing 2 between the cell stacks 5 arranged side-by-side on the first manifold 4, so that the oxygen-containing gas flows along the sides of the fuel cells 3 from a lower end portion toward an upper end portion.

When the two cell stacks 5 are provided as illustrated in FIG. 11, two frame bodies 4a may be bonded to one plate body 4b.

In the configuration disclosed in FIG. 11, the plate body 4b corresponds to the plate body 4b illustrated in FIGS. 2A and 2B, but may include the first groove 16a, the second groove 16b, or the peripheral edge 17 bent toward the cell stack 5, similarly to the plate body 4b disclosed in FIG. 5A, 5B, 6A, 6B, or 7.

The first manifold 4 may include the first through-hole 29a, the second through-hole 29b, or the rectifying plate 28 as in the fuel cell stack device 121 disclosed in FIG. 8A, 8B or 9.

In embodiments in which the fuel gas supply pipe 9 is divided, two second through-holes 20b corresponding to the two divided pipes may be provided.

Figure 12:
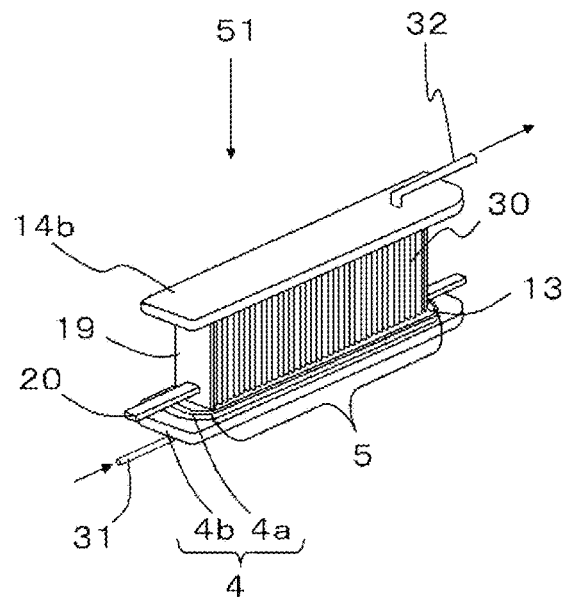
FIG. 12 is an exterior perspective view illustrating an example of an electrolytic cell stack device of the present embodiment.

FIG. 12 is an exterior perspective view illustrating an example of an electrolytic cell stack device of the present embodiment.

Figure 13A:
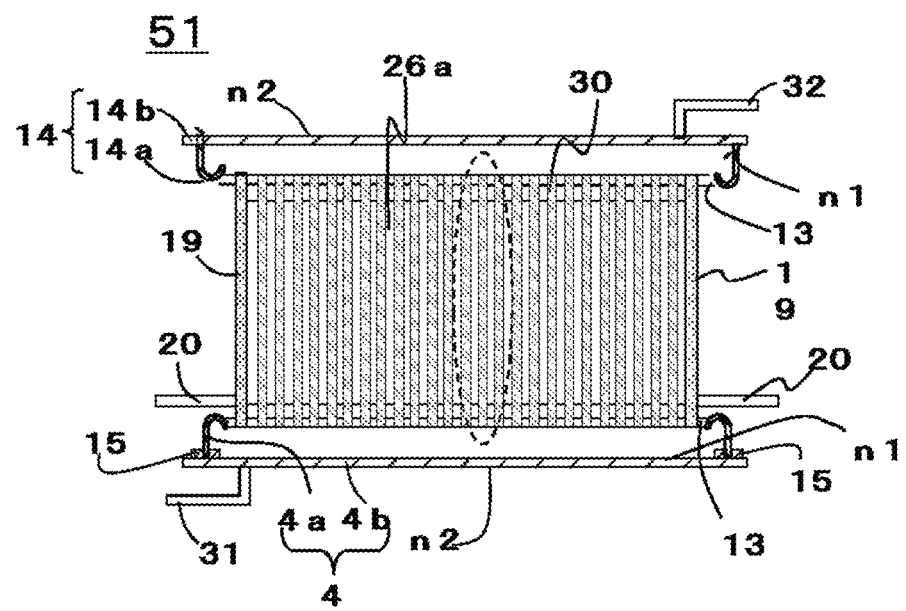
FIG. 13A is a cross-sectional view of a side surface side of the electrolytic cell stack device illustrated in FIG. 12.
Figure 13B:
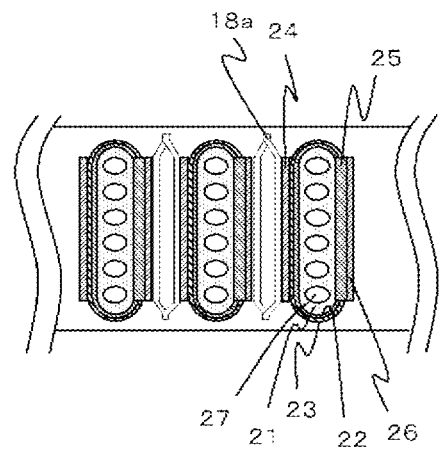
FIG. 13B is a cross-sectional view of an area marked by the dashed line illustrated in FIG. 13A.

FIG. 13A is a cross-sectional view of a side surface side of the electrolytic cell stack device illustrated in FIG. 12. FIG. 13B is a cross-sectional view of an area marked by the dashed line illustrated in FIG. 13A.

Note that a part of hatching is omitted from FIG. 13A.

FIG. 12 illustrates an electrolytic cell stack device 51 that includes a cell stack 5 including electrolytic cells 30 arranged uprightly in a row, each including a gas-flow passage (not illustrated) through which fuel gas flows from a first end of the cell to a second end. The electrolytic cells 30 adjacent to each other are electrically connected in series via inter-cell electrically conductive members (not illustrated in FIG. 12).

As illustrated in FIGS. 12, 13A and 13B, the second end (upper end) of each of the electrolytic cells 30 is fixed to a second manifold 14. The second manifold 14 recovers gas discharged from the electrolytic cells 30.

In the examples illustrated in FIGS. 12, 13A and 13B, the second manifold 14 may also include a frame body 14a that fixes the second end of each of the electrolytic cells 30 inside the frame body 14a with a sealing material 13, and a plate body 14b that is bonded to a first end portion of the frame body 14a and has a rigidity lower than that of the frame body 14a, similarly to the first manifold 4.

This configuration can suppress cracking of the sealing material 13 also on the second manifold 14 side.

The structure and material of the frame body 14a and the plate body 14b constituting the second manifold 14 may be the same as those of the frame body 4a and the plate body 4b constituting the first manifold 4 described above.

A water vapor supply pipe 31 for supplying water vapor is connected to the first manifold 4, and a hydrogen recovery pipe 32 for recovering hydrogen-containing gas is connected to the second manifold 14.

In the electrolytic cell stack device 51 described above, hydrogen-containing gas can be produced by applying voltage to water vapor-containing gas flowing through the gas-flow passages, the first manifold 4 may function as a supply portion for supplying high-temperature water vapor, and the second manifold 14 may function as a recovery portion for recovering the produced hydrogen.

In certain embodiments, the first manifold 4 and the second manifold 14 described above may each have the opposite configuration. In other words, the first manifold 4 may be a recovery portion for recovering the produced hydrogen, and the second manifold 14 may be a supply portion for supplying high-temperature water vapor.

Note that the electrolytic cell 30 illustrated in FIG. 13B can have the same configuration as that of the fuel cell 3 illustrated in FIGS. 1 to 11 described above.

In the configuration disclosed in FIGS. 12, 13A and 13B, the plate body 14b corresponds to the plate body 4b illustrated in FIGS. 2A and 2B, but may be bent toward the cell stack 5 or include the peripheral edge 17 bent toward the cell stack 5, similarly to the plate body 4b disclosed in FIG. 4, 5A, 5B, 6A, 6B, or 7.

In the configuration in which the plate body 14b is bent toward the cell stack 5 as illustrated in FIG. 4, the plate body 14b can be more easily deformed and cracking of the sealing material 15 can be suppressed as described above.

In the configuration in which the plate body 14b includes the first groove 16a or the peripheral edge 17 as illustrated in FIG. 5A, 5B or 7, the frame body 14a can be firmly bonded to the plate body 14b.

In the configuration in which the plate body 14b includes the second groove 16b as illustrated in FIGS. 6A and 6B, when the hydrogen recovery pipe 32 is disposed at the end portion of the plate body 14b in the arrangement direction of the electrolytic cells, hydrogen that flows from the electrolytic cells 30 can be more efficiently recovered.

Additionally, although the electrolytic cell stack device is used for the description of the examples illustrated in FIGS. 12, 13A and 13B, the fuel cell stack device may also be used in the examples illustrated in FIGS. 12, 13A and 13B.

In this case, for example, an off-gas recycling-type fuel cell stack device in which fuel gas is supplied to the first manifold 4 and the second manifold 14 recovers exhaust gas can be used.

Also in this case, electrical current may be drawn from the electrically conductive portion 20.

Figure 14:
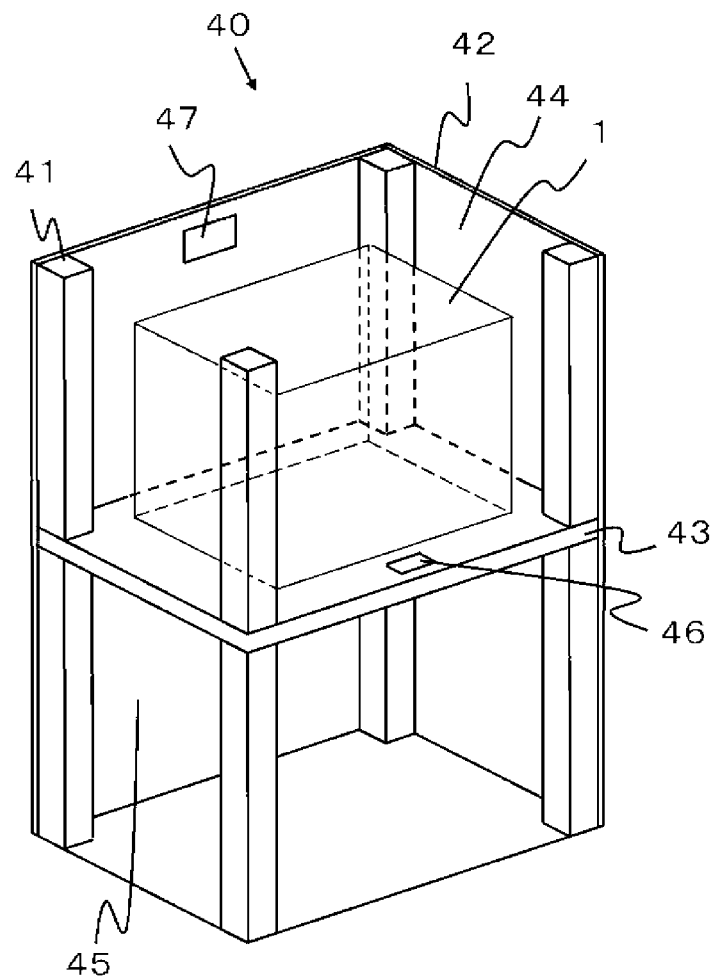
FIG. 14 is an exploded perspective view schematically illustrating an example of a fuel cell device of the present embodiment.

FIG. 14 is an exploded perspective view illustrating an example of a fuel cell device according to the present embodiment in which both the fuel cell module 1 illustrated in FIG. 1 and an auxiliary device (not illustrated) configured to operate the fuel cell module 1 are housed in an external casing.

Note that some of the components of the configuration are not illustrated in FIG. 14.

In a fuel cell device 40 illustrated in FIG. 14, an outer casing formed of struts 41 and exterior plates 42 is divided into an upper and a lower region using a dividing plate 43. The upper region forms a module housing chamber 44 for housing the fuel cell module 1. The lower region forms an auxiliary device housing chamber 45 for housing the auxiliary device configured to operate the fuel cell module 1.

Note that the auxiliary device housed in the auxiliary device housing chamber 45 is not illustrated in FIG. 14.

Furthermore, an airflow hole 46 for allowing air in the auxiliary device housing chamber 45 to flow into the module housing chamber 44 is formed in the dividing plate 43, and an exhaust hole 47 for exhausting air out of the module housing chamber 44 is formed in one of the exterior plates 42 of the module housing chamber 44.

In this fuel cell device 40, the fuel cell module 1 having improved long-term reliability as described above is housed in the module housing chamber 44, and the auxiliary device configured to operate the fuel cell module 1 is housed in the auxiliary device housing chamber 45. This configuration can provide the fuel cell device 40 with improved long-term reliability.

The present invention has been described in detail above. However, the present invention is not limited to the embodiments described above, and various modifications or improvements can be made without departing from the essential spirit of the present invention.

The examples described above make reference to vertical cells 3. However, cells referred to commonly as "horizontal cells", in which a plurality of power generating elements or electrolytic elements are formed on a support body may also be used.

REFERENCE SIGNS LIST

1 Fuel cell module
2 Housing
3 Fuel cell
4 First manifold
4a Frame body
4b Plate body
5 Cell stack
12, 120, 121, 122 Fuel cell stack device
13 Sealing material
14 Second manifold
14a Frame body
14b Plate body
15 Bonding material
16 Groove
16a First groove
16b Second groove
17 Peripheral edge
18 (18a, 18b) Electrically conductive member
28 Rectifying plate
29 Through-hole
29a First through-hole
29b Second through-hole
30 Electrolytic cell
40 Fuel cell device
51 Electrolytic cell stack device

What is claimed is:

1. A cell stack device, comprising:
a cell stack comprising a plurality of arranged cells; and
a first manifold configured to fix a first end of each of the cells with a sealing material and supply a reactive gas to the cells, wherein
the first manifold comprises
a frame body configured to fix the first end of each of the cells with the sealing material inside the frame body, and
a plate body bonded to a first end portion of the frame body and having a rigidity lower than that of the frame body.

2. The cell stack device according to claim 1, wherein the plate body bent toward the cell stack.

3. The cell stack device according to claim 1, wherein:
the plate body has a first surface to which the frame body is bonded and a second surface opposite to the first surface;
a first groove having an annular shape is provided in the first surface of the plate body; and
the first end portion of the frame body is bonded to an inner portion of the first groove.

4. The cell stack device according to claim 3, wherein the plate body comprises a second recessed area in the first surface that extends in an arrangement direction of the cells on an inner side of the first groove in plan view.

5. The cell stack device according to claim 1, wherein:
the plate body has a first surface to which the frame body is bonded and a second surface opposite to the first surface;
a peripheral edge of the plate body is bent toward the cell stack;
the first end portion of the frame body is bonded to the plate body with a bonding material; and
the bonding material is provided in the frame body and on the first surface.

6. The cell stack device according to claim 1, comprising:
a reformer disposed above the first manifold; and
a fuel gas leading-out pipe configured to lead fuel gas from the reformer to the first manifold, wherein
a first end of the fuel gas leading-out pipe is connected to a first through-hole that penetrates an inner portion of the plate body enclosed by the frame body from the second surface side in plan view, and
the first manifold includes a rectifying plate that is separated from the first end of the fuel gas leading-out pipe and covers the first end of the fuel gas leading-out pipe.

7. The cell stack device according to claim 6, wherein the fuel gas leading-out pipe is inserted in a second through-hole that penetrates an outer portion of the plate body outside of the inner portion enclosed by the frame body, and the fuel gas leading-out pipe is bonded to the plate body at the second-through hole.

8. The cell stack device according to claim 1, further comprising:
a second manifold configured to fix a second end of each of the cells with a sealing material and recover a gas discharged from the cells, wherein
the second manifold comprises
a frame body configured to fix the second end of each of the cells with the sealing material inside the frame body, and
a plate body bonded to a first end portion of the frame body and having rigidity lower than that of the frame body.

9. A module, comprising:
a housing; and the cell stack device according to claim 1 housed in the housing.

10. A module housing device comprising:
an external casing;
the module according to claim 9 housed in the external casing; and
an auxiliary device configured to operate the module housed in the external casing.

11. The cell stack device according to claim 2, wherein:
the plate body has a first surface to which the frame body is bonded and a second surface opposite to the first surface;
a first groove having an annular shape is provided in the first surface of the plate body; and
the first end portion of the frame body is bonded to an inner portion of the first groove.

12. The cell stack device according to claim 11, wherein the plate body comprises a second recessed area in the first surface that extends in an arrangement direction of the cells on an inner side of the first groove in plan view.

13. The cell stack device according to claim 2, wherein:
the plate body has a first surface to which the frame body is bonded and a second surface opposite to the first surface;
a peripheral edge of the plate body is bent toward the cell stack;
the first end portion of the frame body is bonded to the plate body with a bonding material; and
the bonding material is provided in the frame body and on the first surface.

14. The cell stack device according to claim 2, comprising:
a reformer disposed above the first manifold; and
a fuel gas leading-out pipe configured to lead fuel gas from the reformer to the first manifold, wherein
a first end of the fuel gas leading-out pipe is connected to a first through-hole that penetrates an inner portion of the plate body enclosed by the frame body from the second surface side in plan view, and
the first manifold includes a rectifying plate that is separated from the first end of the fuel gas leading-out pipe and covers the first end of the fuel gas leading-out pipe.

15. The cell stack device according to claim 14, wherein the fuel gas leading-out pipe is inserted in a second through-hole that penetrates an outer portion of the plate body outside of the inner portion enclosed by the frame body, and the fuel gas leading-out pipe is bonded to the plate body at the second-through hole.

16. A module, comprising:
a housing; and
the cell stack device according to claim 8 housed in the housing.

17. A module housing device comprising:
an external casing;
the module according to claim 16 housed in the external casing; and
an auxiliary device configured to operate the module housed in the external casing.

18. The cell stack device according to claim 1, wherein the plate body has a bend toward the cell stack that is configured to decrease the rigidity of the plate body compared to the frame body.

19. The cell stack device according to claim 1, wherein the plate body is configured to deform due to a bend in the plate body when forces are exerted, in an arrangement direction of the plurality of arranged cells, on the plate body.

* * * * *